No. 657,900. Patented Sept. 11, 1900.
E. J. DUFF.
MULTIPLE EFFECT EVAPORATING APPARATUS.
(Application filed Feb. 13, 1900.)
(No Model.)
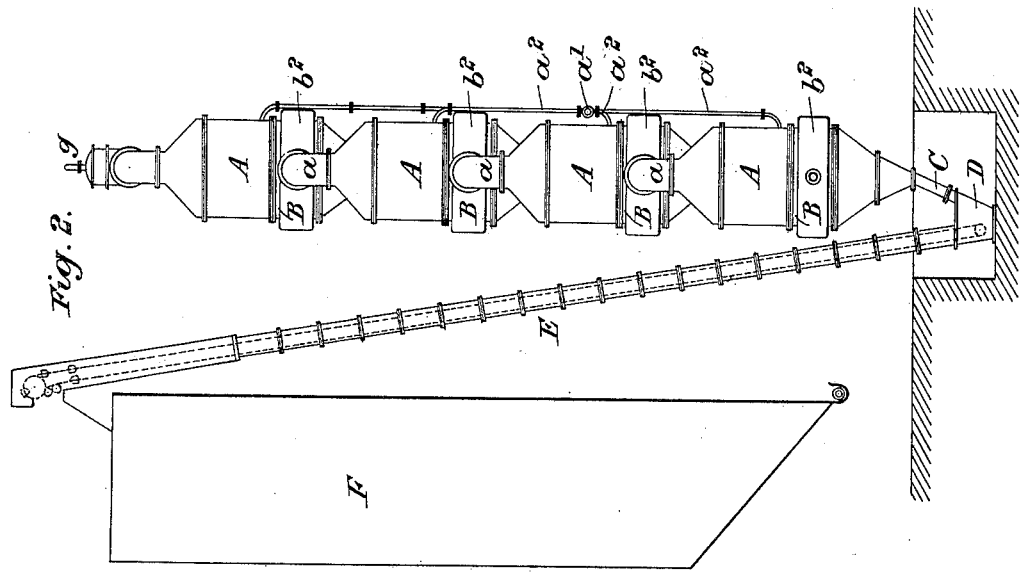
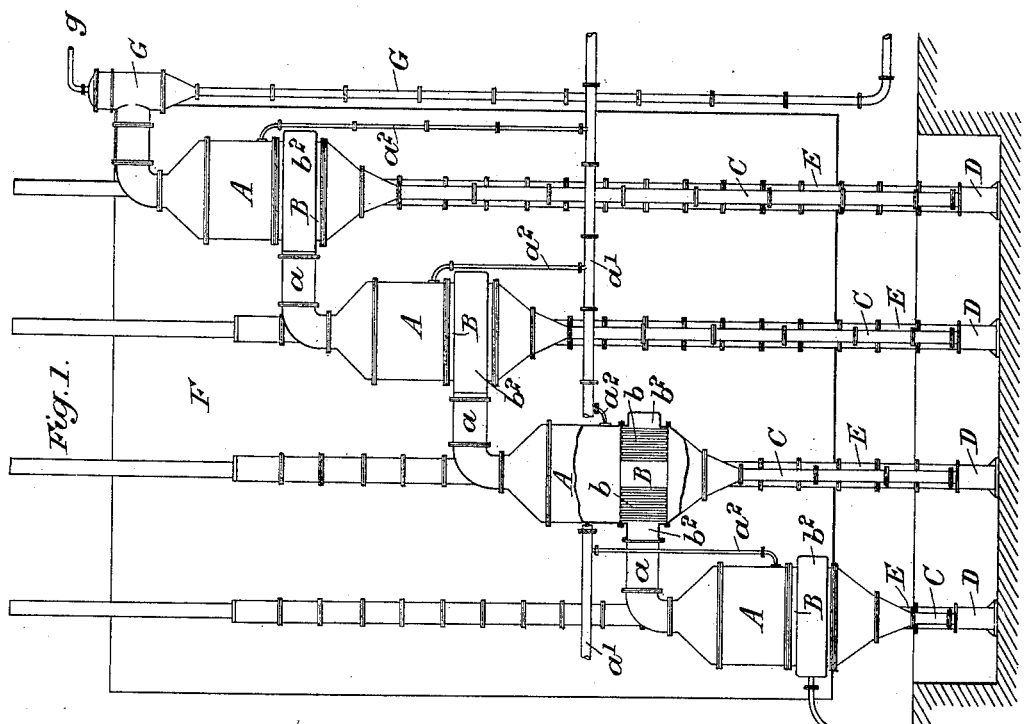
Witnesses.
Inventor
Edward James Duff
by Philip Mauro
his attorney

UNITED STATES PATENT OFFICE.

EDWARD JAMES DUFF, OF LIVERPOOL, ENGLAND, ASSIGNOR OF ONE-HALF TO THE UNITED ALKALI COMPANY, LIMITED, OF SAME PLACE.

MULTIPLE-EFFECT EVAPORATING APPARATUS.

SPECIFICATION forming part of Letters Patent No. 657,900, dated September 11, 1900.

Application filed February 13, 1900. Serial No. 5,115. (No model.)

*To all whom it may concern:*

Be it known that I, EDWARD JAMES DUFF, engineer a subject of the Queen of Great Britain and Ireland, residing at 30 James street, Liverpool, in the county of Lancaster, England, have invented certain new and useful Improvements in Multiple-Effect Brine-Evaporating Apparatus; and I do hereby declare the following to be a full, clear, and exact description of the invention, such as will enable others skilled in the art to which it appertains to make and use the same.

This invention relates to apparatus for evaporating brine and the like; and among its objects are to provide a series of separate vacuum-pans each open to access on all sides, so that it may be fed and repaired separately, to shorten and straighten the connections for steam in order to dispense with return-coils, &c., and, in short, to produce the most efficient results with the greatest economy of construction and to minimize the loss of heat by radiation.

The invention will be best understood by reference to the accompanying drawings, in which—

Figure 1 is a front elevation of one form of my invention, one pan being partly broken away; and Fig. 2 is a side elevation of the same viewed from the left of Fig. 1.

Reference-letters A represent the vacuum-pans, of which the drawings show four; but of course any number may be employed. Each pan has a heating-chamber B, shown here as a belt or drum $b^2$, for steam or other heating agent and provided with the (vertical) tubes $b$ for circulation of the brine in the pan. Each pan also has the leg C, terminating in the boot D, from which rises an elevator E to discharge into the receptacle F. At the top of each pan is a short thick outlet-neck $a$, extending substantially horizontally. According to my invention these vacuum-pans are arranged in an ascending series side by side, but each except the first somewhat above the level of the preceding one, so that its heating-chamber will be on a level with the neck of that preceding pan. The feed-pipe $a'$ has the branches $a^2$ for introducing brine into each pan A, being, of course, provided with the usual stop-cocks.

G G is a condenser into which cold water enters at $g$ and with which the outlet-neck $a$ of the last or upper pan A communicates.

Steam or other heating agent is admitted by pipe $b^3$ into the heating-chamber B of the first or lowest pan A. The steam resulting from the consequent evaporation of the brine in that pan rises upward and passes through neck $a$ into the heating-chamber of the next pan in the series in such a direction as to impinge directly against the tubes $b$ thereof, and so on until the steam from the last pan is drawn into the condenser G, which is effecctual in the production of a vacuum.

I do not limit myself to the exact construction of details, as my invention lies principally in the relative arrangement of tanks.

Having thus described my invention, I claim—

A multiple-effect brine-evaporating apparatus, comprising a number of separate and independent vacuum-pans arranged side by side in ascending series, each pan being provided with a heating-chamber and having at its top a horizontal outlet-neck, and the neck of each pan communicating directly with the heating-chamber of the next higher pan in the series, as and for the purpose set forth.

In testimony whereof I affix my signature in presence of two witnesses.

EDWARD JAMES DUFF.

Witnesses:
ALFRED PATCHETT,
THOMAS SPROAT.